L. GEIGER.

Breech-Loading Fire-Arm.

No. 2,231. Reissued April 17, 1866.

Witnesses:
J. W. Crombie
A. C. Paul

Inventor:
L. Geiger
per Munn & Co
attorneys

N. PETERS, PHOTO-LITHOGRAPHER, WASHINGTON, D. C.

UNITED STATES PATENT OFFICE.

LEONARD GEIGER, OF HUDSON, ASSIGNOR, BY MESNE ASSIGNMENTS, TO CHARLES C. ALGER, OF NEW YORK, N. Y.

IMPROVEMENT IN BREECH-LOADING FIRE-ARMS.

Specification forming part of Letters Patent No. 37,501, dated January 27, 1863; Reissue No. 2,231, dated April 17, 1866.

*To all whom it may concern:*

Be it known that I, LEONARD GEIGER, of Hudson, Columbia county, State of New York, have invented certain new and useful Improvements in Breech-Loading Fire-Arms; and I do hereby declare that the following is a full, clear, and exact description of the same, reference being had to the accompanying drawings, forming a part of this description, in which—

Figure 1:
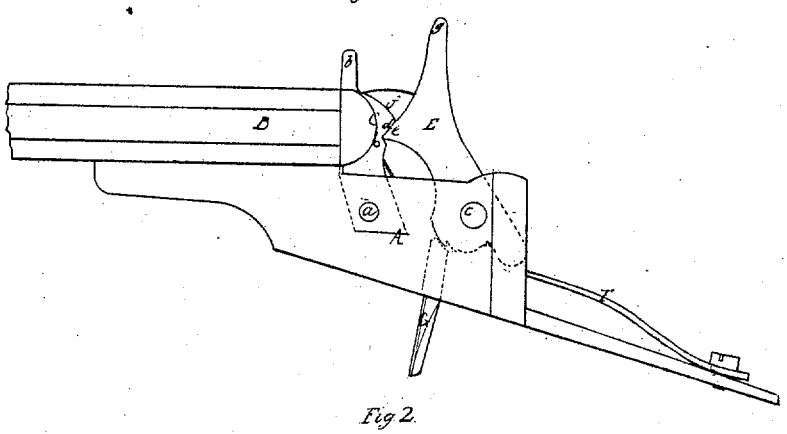
Figure 2:
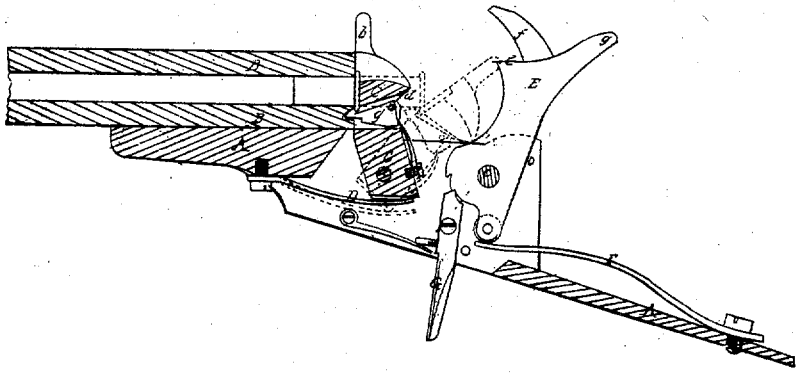
Figure 3:
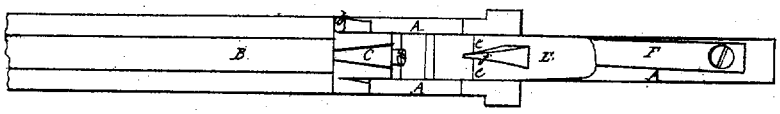

Figure 1 is a side elevation of a part of a barrel and breech-frame of a fire-arm with my improvements applied thereto. Fig. 2 is a longitudinal section through the same in the axis of the barrel, and Fig. 3 is a plan of the same.

My improvements consist in certain new combinations of a barrel bored through from end to end, with a swinging breech-piece and other devices, as hereinafter specified, these improvements conducing to facility of manipulation of the arm and cheapness of construction.

In the accompanying drawings, which exhibit my invention in the form preferred by me, A is the breech-frame, which connects the barrel B with the stock. C is the swinging breech-piece, or breech-piece working upon a pin, *a*, in a mortise or slot in the frame A, and furnished with an ear or thumb-piece, *b*, by means of which the breech may be opened or closed.

D is a spring acting upon the breech-piece for the purpose of keeping it closed when the hammer is drawn back. The same spring serves also to hold the breech open during the operation of loading.

In Fig. 2 the black outlines show the breech and spring in the closed, and the red outlines in the open position of the former.

E is a piece of metal which constitutes the hammer *f*, the thumb-piece *g*, the tumbler *h*, and the locking-shoulder *e*, and these parts all move together when the arm is fired. This piece is pivoted upon a strong pin, *c*. The breech is so formed at *d* that it may be locked by the shoulder *e*. The piece E is provided with a mainspring, F, to throw it toward the breech, and a trigger, G.

By inspection of the drawings it will be perceived that the swinging breech-piece vibrates in a plane passing through the axis of the barrel, and is moved by an ear projecting above the breech-frame, and above the pin on which the breech-piece swings, instead of by means of a lever or other device projecting below the barrel, as is usually the case; and by this arrangement the construction of the gun is cheapened, the slot or opening in the lower side of the breech-frame is dispensed with, and the manipulation of the arm is more easy, as the opening of the breech is effected by a motion similar to the ordinary cocking of a gun. It will also be perceived that the breech-piece is not chambered to receive a cartridge within it, but is a block or gate for closing the butt of the barrel after the cartridge is inserted into that butt. The breech-piece may therefore be called a "solid breech-piece" to distinguish it from the chambered breech-pieces sometimes used in fire-arms.

By inspection of the drawings it will also be seen that the swinging breech-piece is locked, to resist the explosion of the charge, by a swinging shoulder detached from the breech-piece and thrown into place prior to the firing of the charge. It will likewise be noticed that both the hammer and the swinging shoulder are independent of the breech-piece in its motions, or, in other words, that the arm may be cocked or half-cocked, or the shoulder withdrawn from or replaced in the locking position, without opening the breech-piece, and that the breech-piece is held shut, while the shoulder is out of contact with it, by a spring, and also that the combination is such that the shoulder resists the force of the explosion, and the following results follow from these peculiarities in construction: First, all devices for locking the breech-piece and resisting the strain of the explosion, except the shoulder swinging on a pivot, are dispensed with; second, the gun may be carried either full or half cocked when loaded without danger of the falling out of the cartridge; third, that the locking of the breech-piece is effected prior to the explosion of the charge, and that the gun cannot be fired unless the breech is closed and the breech-piece locked; fourth, that the breech-piece is unlocked, so that it may be opened by pulling back the shoulder by means of a thumb-piece after it has been thrown into the locking position by the mainspring.

In order to load the gun, it is first cocked or half-cocked, which will withdraw the shoulder and unlock the breech-piece. The breech-piece is then pulled back by taking hold of the ear, as in cocking a common gun, and will be held open by the spring in the precise construction shown in the drawings. The cartridge is then to be shoved in, ball first, and the breech-piece closed, being held closed by the spring, so that the cartridge will not be displaced even if the hammer be kept at full or half cock.

The gun may be fired in the usual way, and the shoulder will be carried under the breech-piece, so as to lock the breech, the strain of the explosion being sustained by the swinging shoulder, the hammer being unable to explode the charge until the shoulder locks the breech-piece.

Any proper kinds of cartridges may be employed, and the firing may be effected by a percussion-cap or other kind of priming; but I prefer to use cartridges with metal cases, which also contain the priming.

Fig. 2 represents, attached to the breech-piece, a contrivance for withdrawing from the barrel the cases or shells of exploded cartridges.

I do not restrict my claims to a shoulder or abutting piece made in one piece with a hammer, although I prefer that construction, the various peculiarities of construction that are important in the combinations hereinafter specified being that the shoulder moves with the hammer, so that the falling of the latter insures the locking of the breech, and also that the swinging shoulder locks the swinging breech, so that the force, strain, or shock of the explosion is transferred to and resisted by the swinging shoulder, and likewise that this shoulder is withdrawn from the locking position by means of a thumb-piece projecting above the breech-frame. Neither do I claim an ear or handle or thumb-piece made in one piece with a swinging breech-piece, although I prefer that construction, the peculiarity of construction that is important being not in the mode of connection, but in the position of the ear and the plane of vibration of the breech-piece, as before described, so that the breech-piece may be opened by a manipulation similar to cocking an ordinary gun-lock.

I do not claim a swinging or pivoted breech-piece by itself, nor a swinging breech-piece in combination with an independent hammer, as there are many well-known forms of such contrivances; and I do not claim a swinging breech-piece in combination with a hammer and a locking-shoulder which are so connected in operation with the breech-piece by mechanical devices that the breech-piece moves when the hammer and the shoulder move, and vice versa; but I do claim as my own invention in fire-arms—

1. These elements, in combination—viz., a barrel open at the breech, a solid breech-piece swinging in the plane of the barrel, an independent hammer, and a shoulder operated thereby for the purpose of locking or unlocking the breech, substantially as set forth, the combination being substantially as described.

2. In combination with a barrel open at the breech, a hammer independent of the breech-piece, and a solid breech-piece swinging in the plane of the barrel, an ear or thumb-piece located substantially as described, by which the breech-piece may be operated from above its center of motion, in the manner set forth, the combination being substantially such as hereinbefore specified.

3. An independent hammer and a swinging shoulder to lock a solid breech-piece swinging in the plane of the barrel, and to receive the strain of the explosion, in combination with a spring which holds the breech-piece closed, in the manner and for the purpose specified, the combination being substantially such as described.

4. A solid breech-piece swinging in the plane of the barrel, and a barrel open at the breech, in combination with an independent swinging shoulder (not attached to the breech-piece) to receive the strain of the explosion, and a spring to force the shoulder into its locking position, the combination being substantially such as described.

5. In combination with a barrel open at the breech, and a solid breech-piece swinging in the plane of the barrel, a swinging locking-shoulder to receive the strain of the explosion, and an ear or thumb-piece projecting above the breech-frame, by means of which the said shoulder may be withdrawn from the breech-piece to permit the opening thereof, the combination being substantially such as described.

6. In combination with a barrel open at the breech, and a solid breech-piece swinging in the plane of the barrel, and a swinging locking-shoulder, an ear or thumb-piece located above the center of motion of the breech-piece, whereby the breech-piece can be opened after the shoulder has been withdrawn, the manipulation to open the breech-piece being similar to cocking an ordinary gun-lock, and the combination being substantially as set forth.

In testimony whereof I have hereunto subscribed my name.

LEONARD GEIGER.

In presence of—
S. J. GORDON,
GEO. H. COLLINS.